United States Patent
Kessler et al.

(10) Patent No.: US 7,512,478 B2
(45) Date of Patent: Mar. 31, 2009

(54) METHOD FOR OPERATING AN INTERNAL COMBUSTION ENGINE

(75) Inventors: Michael Kessler, Weissach (DE); Thomas Bossmeyer, Korntal-Muenchingen (DE); Michael Kolbe, Ortenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/897,301

(22) Filed: Aug. 29, 2007

(65) Prior Publication Data
US 2008/0059048 A1 Mar. 6, 2008

(30) Foreign Application Priority Data
Aug. 29, 2006 (DE) .................. 10 2006 040 337

(51) Int. Cl.
*F02D 41/00* (2006.01)
*G06F 19/00* (2006.01)

(52) U.S. Cl. .................. 701/103; 123/435; 701/110

(58) Field of Classification Search ........... 701/103, 701/110, 115, 102; 123/435, 406.29
See application file for complete search history.

(56) References Cited

U.S. PATENT DOCUMENTS
4,774,922 A * 10/1988 Morita .................. 123/406.29

FOREIGN PATENT DOCUMENTS
JP 2000-64890 A * 2/2000

* cited by examiner

*Primary Examiner*—Hieu T Vo
(74) *Attorney, Agent, or Firm*—Kenyon & Kenyon LLP (57) ABSTRACT

To enable operation of an internal combustion engine even without the signals of a phase sensor while nonetheless enabling an emergency driving function in the case of a disturbance of a crankshaft signal acquired by a crankshaft sensor, a cylinder pressure is acquired using a cylinder pressure sensor and it is checked whether the cylinder pressure reaches a prespecifiable threshold value. When the threshold value is reached or exceeded, an angular position associated with the threshold value is inferred. The angular position is then made available for an operation of the internal combustion engine.

22 Claims, 3 Drawing Sheets

METHOD FOR OPERATING AN INTERNAL COMBUSTION ENGINE

FIELD OF THE INVENTION

The present invention relates to a method for operating an internal combustion engine, the internal combustion engine having at least one cylinder, and a cylinder pressure sensor being allocated to the cylinder. The present invention also relates to an internal combustion engine having at least one cylinder, a cylinder pressure sensor being allocated to the cylinder. In addition, the present invention relates to a control device for controlling and regulating an internal combustion engine comprising at least one cylinder, a cylinder pressure sensor being allocated to the least one cylinder. Finally, the present invention relates to a computer program that is capable of being executed on a computing device, in particular on a control device for controlling and regulating an internal combustion engine.

BACKGROUND INFORMATION

The operation of an internal combustion engine, for example a gasoline engine or a diesel engine, requires a controlling or regulating of the internal combustion engine, primarily in order to set the torque produced. For this purpose, in various subsystems of the controlling/regulating of the internal combustion engine, also called engine controlling, the quantities that influence the torque are controlled/regulated. The subsystems include what is known as a filling control, a mixture formation, and, in gasoline engines, an ignition. An important input quantity for the engine controlling is a current angular position of the internal combustion engine.

Additional important quantities include a current rotational speed, or a current angular speed.

In the mixture formation, the optimal time of injection is determined as a function of the current rotational speed and the current angular position of the internal combustion engine. In the ignition subsystem, the crankshaft angle is determined at which an ignition of the air-fuel mixture introduced during the mixture formation should take place. It is known to acquire the current angular position using a crankshaft sensor wheel fastened to a crankshaft, and a crankshaft sensor. In a four-stroke motor, one work cycle extends over 720° of crankshaft. Because here the crankshaft executes two complete rotations in one work cycle, the position within the work cycle that is determined using the crankshaft sensor is ambiguous. In order to resolve the ambiguity, use is made of what is known as a phase sensor and a camshaft sensor wheel connected to a camshaft in order to determine whether the current position is to be determined relative to the first rotation of the crankshaft (0 to 360°) or to the second rotation of the crankshaft (360-720°).

A failure of the component required for the determination of the current angular position can have the result that the current angular position can no longer be determined and the internal combustion engine can no longer be controlled. In order nonetheless to enable emergency operation of the internal combustion engine using an emergency driving function in case of disturbance of the crankshaft sensor, it is known to determine what is known as a substitute rotational speed using the phase sensor. The substitute rotational speed can then be used for a plausibility test relating to the rotational speed determined from the obtained crankshaft signals. In the case of a disturbance of the crankshaft sensor, an emergency driving function is thus capable of being realized. For this purpose, the camshaft sensor wheel must have a corresponding shape so that an engine position or rotational speed is able to be determined.

However, the angular position of the internal combustion engine (engine position) determined using the camshaft sensor, and the rotational speed determined therewith, is often very imprecise, so that the emergency driving function enables only an unsatisfactory operation of the internal combustion engine. However, in the case of a disturbance of the crankshaft sensor, disturbance of the phase sensor or of the camshaft sensor wheel regularly has the result that the internal combustion engine can no longer be operated. Moreover, in known systems it can occur that it cannot be determined whether disturbance of the crankshaft sensor or of the phase sensor is present. In this case, an emergency driving function usually also cannot be realized.

In addition, the phase sensor, the camshaft sensor wheel, the cabling, and the fastening of these components is cost-intensive, so that it would be desirable to be able to do without these components, in particular given production with high piece counts.

DISCLOSURE OF THE INVENTION

The object of the present invention is to enable an operation of the internal combustion engine even without the signals from a phase sensor. Furthermore, it is the object of the present invention to enable an improved emergency driving function if a disturbance of the crankshaft signal is present. Moreover, it is the object of the present invention to provide a possibility for being able to execute an improved plausibility test with respect to the determined current angular position.

This object is achieved by a method of the type named above in that the cylinder pressure is acquired by a cylinder pressure sensor and it is checked whether the cylinder pressure reaches a prespecifiable threshold value. If the threshold value is reached or exceeded, an angular position associated with the threshold value is inferred. The angular position is then made available for operation of the internal combustion engine.

The method according to the present invention consequently enables the determination of the current angular position of the internal combustion engine as a function of a cylinder pressure signal. Here, when a particular cylinder pressure signal is present a particular angular position is inferred. Using the cylinder pressure signal, the information previously obtained using the camshaft sensor wheel and the camshaft sensor can be provided. In this way, an emergency driving function can be realized if the expected signal from a phase sensor is disturbed.

In addition, the method according to the present invention makes it possible to do without a phase sensor and the camshaft sensor wheel. When there is a failure of the crankshaft sensor, the method according to the present invention provides at least one additional signal with which the current angular position can be determined. Dependent on the current angular position, a controlling or regulation of the internal combustion engine can then take place in the context of an emergency driving function.

The threshold value may be specified in such a way that it is reached only once per work cycle. In a 4-stroke engine, the threshold value may consequently be selected such that it is reached only every 720° of crankshaft angle. In this way, the position of the internal combustion engine, i.e. the current angular position, can always be unambiguously determined.

According to another specific embodiment of the method according to the present invention, the threshold value describes a pressure that occurs during the compression phase, in particular a pressure before the beginning of combustion. In the compression phase, in particular before the beginning of a combustion, intake and outlet valves that are present are closed. As a result, a relatively uniform pressure prevails inside the combustion chamber, so that the pressure determination is more reliable. Because the combustion produces still higher pressures, but the combustion takes place in a non-uniform fashion and the resulting pressure is for example dependent on the current mixture formation, a particularly reliable determination of the angular position is possible before the beginning of the combustion.

The threshold value may be far enough away from a low-pressure phase such that a disturbance due to the transition from the low-pressure phase to the compression phase is as low as possible. This excludes from the outset errors that can arise due to pressure fluctuations during the transition from the low-pressure phase to the high-pressure phase.

It is particularly advantageous if the threshold value describes a pressure that occurs during the compression phase before the beginning of a fuel metering, so that a controlling of a fuel metering device, for example an injection valve, can take place while already taking into account the currently determined angular position. This enables a particularly reliable controlling of the fuel metering device and of the ignition, so that a reliable emergency driving function can be realized.

The threshold value may describe a maximum pressure. This enables a particularly precise detection of the achieving of the threshold value, which can be determined in that a lower pressure is acquired beforehand and afterwards. For example, the maximum can be considered to be determined if, at least within prespecified limits, no pressure increase takes place, or a pressure decrease takes place.

Advantageously, the internal combustion engine is operated with a combustion that is late enough that the pressure curve has two maxima per work cycle. Here, it is particularly advantageous if the threshold value corresponds to the first maximum.

A late combustion means that the combustion, and this may also include the metering of fuel, takes place only after what is called the upper dead center is reached. The upper dead center describes the position of the piston in the compression phase in which the volume of the combustion chamber is minimal. Thus, a pressure maximum can be determined at this point. This pressure maximum corresponds relatively precisely to the upper dead center (0° crankshaft angle). Given such a selection of the threshold value, it is possible to determine the angular position of the internal combustion engine with a relatively high degree of precision.

According to a particular specific embodiment, another pressure sensor is allocated to at least one additional cylinder. Using the additional pressure sensor, the cylinder pressure of the additional sensor is acquired and it is checked whether the cylinder pressure reaches or exceeds a prespecifiable additional threshold value. Upon the reaching or exceeding of the additional threshold value, an angular position associated with the threshold value is inferred. Through the acquisition of a plurality of achieved threshold values and the determination of a plurality of angular positions associated with the threshold values, an improved and more current position determination, and thus an improved emergency driving function, can be realized.

The same threshold value may be specified for all cylinders. In particular, the threshold values may be selected such that the angular positions associated with the threshold values for each pair of successive cylinders have the same angular difference. Two cylinders are to be regarded as successive if they have the smallest phase displacement relative to the work cycle. Two cylinders are thus successive if between the ignition of the fuel mixture in the first cylinder and the ignition of the fuel mixture in the second cylinder no ignition takes place of a fuel mixture in another cylinder.

This specific embodiment makes it possible to determine particularly up-to-date angular positions in a particularly precise manner, because the angular differences of two successive cylinders are known. If the angular positions associated with the threshold values of two successive cylinders have the same angular difference, a uniform distribution of the acquired angular positions can be achieved over the entire work cycle. In a two-cylinder internal combustion engine, a new determination of the current angular position is thus possible after every 360° of crankshaft angle, i.e., after half of the work cycle of each cylinder. If, in a four-cylinder internal combustion engine, a pressure sensor is allocated to each of the four cylinders, a current angular position can be determined every 180° of crankshaft angle. In a six-cylinder internal combustion engine, the determination can be made after 120° of crankshaft angle, and in an eight-cylinder internal combustion engine it can be made after 90° of crankshaft angle. Of course, it is also possible that not every cylinder has a cylinder pressure sensor allocated to it. For example, in an eight-cylinder internal combustion engine it is possible to allocate a pressure sensor to only two or four cylinders. In this case, a current angular position would be capable of being determined every 360° of crankshaft angle or every 180° of crankshaft angle.

It is especially advantageous if the threshold value or the angular position is determined as a function of a current charge pressure. The charge pressure varies for example as a function of a current rotational speed. The charge pressure varies in particular if the internal combustion engine has an allocated charge device, for example a compressor or a turbocharger. The change in the charge pressure causes a change in the cylinder pressure determined by the pressure sensor. This results in a shifting of the threshold value assigned to a particular angular position. As a result, taking the charge pressure into account enables a more reliable determination of the current angular position.

The angular position may be determined as a function of a specifiable loss angle that is dependent on an operating point. An operating point-type loss angle enables for example a compensation of errors that can occur as a function of a current operating situation. For example, in this way it can be taken into account that given a particularly high rotational speed the time between the acquisition of the pressure signal and the determination of the angular position always has the result that the current angular position lags behind the determined current angular position. This effect is greater the larger the current rotational speed is. This can be compensated for example using a loss angle that is dependent on the rotational speed.

A continuous position determination may be determined by extrapolating the values between each pair of angular positions determined as a function of the cylinder pressure. In this way, it is possible at each operating time point to determine the current angular position and to use this position for a controlling or regulation of the internal combustion engine.

According to another specific embodiment of the method according to the present invention, an angular speed is determined as a function of the determined angular values, and a current rotational speed is inferred therefrom. This enables a particularly good realization of an emergency driving function, because a multiplicity of subtasks, for example mixture formation, must be carried out as a function of the current rotational speed.

According to another specific embodiment, at least one cylinder pressure sensor is assigned to a first set and at least one additional cylinder pressure sensor is assigned to a second set, the first and second sets being disjoint. The first and second sets of cylinder pressure sensors can for example each contain a cylinder pressure sensor, so that the first set contains a cylinder pressure sensor of a first cylinder and the second set contains a cylinder pressure sensor of a second cylinder. According to this specific embodiment, a first angular speed is then determined as a function of the acquired cylinder pressures of the first set of cylinders and a second angular speed is determined as a function of the acquired cylinder pressures of the second set of cylinders.

Thus, two determined angular speeds are always redundantly available. From these angular speeds, a mean value can advantageously be formed in order to further increase precision. Alternatively, or in addition, it is also possible to carry out a plausibility test using the separately determined angular speeds. In this way, it can for example be recognized whether one or more cylinder pressure sensors are disturbed. With Redundant values of this sort, a more reliable operation of the internal combustion engine can again be achieved.

Advantageously, the time between an achieving of the threshold value and a subsequent achieving of the threshold value by the same cylinder pressure sensor or by another cylinder pressure sensor is determined. As a function of an angular difference determined therefrom and a determined time between the first reaching of the threshold value and the following reaching of the threshold value, a current rotational speed is inferred. This enables a particularly precise determination of the rotational speed, because all available cylinder pressure signals, or all available angular differences, can be currently used for a determination of the rotational speed.

The rotational speeds may also be determined redundantly, so that the formation of a mean value for the current rotational speed and/or a plausibility test of the redundantly determined rotational speeds can be carried out.

According to another specific embodiment, an acceleration is determined and the rotational speed is determined as a function of the determined acceleration. Advantageously, the acceleration is determined by comparing a time difference and a previously measured time difference. Because an acceleration also causes an increase in the rotational speed within a work cycle, in this way a particularly exact determination of the rotational speed can be achieved.

According to a development, the method is executed permanently at least after synchronization of the internal combustion engine has been achieved during a startup, and a functional test of the crankshaft sensor, a functional test of the phase sensor, and/or a functional test of the pressure sensor is carried out. In addition, or alternatively, a plausibility test of the crankshaft signal, of the phase sensor signal, and/or of the pressure sensor signal can take place. In addition, and/or alternatively, the method according to the present invention can also recognize the threat of an engine overload or ignition misfiring.

The object is also achieved by an internal combustion engine of the type named above in that the internal combustion engine has an arrangement for carrying out the method according to the present invention.

In addition, the object is achieved by a control device of the type named above in that the control device is capable of being connected to the cylinder pressure sensor, and a signal that describes a cylinder pressure is capable of being communicated from the cylinder pressure sensor to the control device, and the control device has a test arrangement for testing whether the cylinder pressure reaches a prespecifiable threshold value, and the control device has an arrangement for inferring an angular position associated with the threshold value if the prespecifiable threshold value is reached.

The object is also achieved by a computer program of the type named above in that the computer program is programmed for the execution of the method according to the present invention when the computer program is running on the computing device, in particular on the control device. In this way, the computer program also represents the invention, as does the method for the execution of which the computer program has been programmed.

Additional features, possible applications, and advantages of the exemplary embodiments and/or exemplary method of the present invention result from the following description of exemplary embodiments of the present invention shown in the drawings.

DETAILED DESCRIPTION

Figure 1:
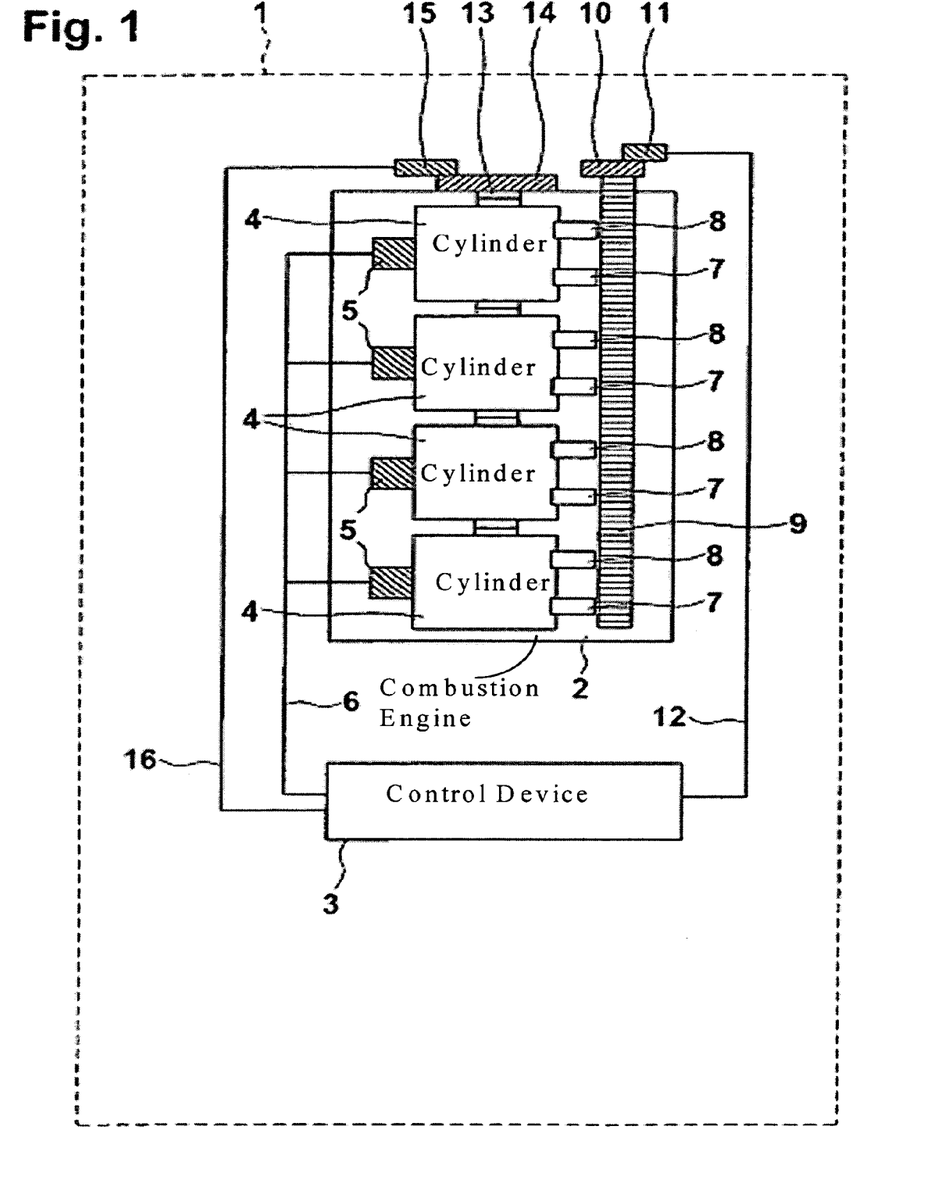
FIG. 1 shows a schematic representation of an internal combustion engine situated in a vehicle and set up for the execution of the method according to the present invention.

FIG. 1 shows an internal combustion engine 2 that is situated in a vehicle 1 represented by a dotted line. Internal combustion engine 2 has cylinders 4 to each of which a cylinder pressure sensor 5 is allocated in such a way that a pressure currently prevailing in the combustion chamber of cylinder 4 is capable of being acquired. Cylinder pressure sensors 5 are connected to a control device 3 via a signal line 6.

To each cylinder 4 there is allocated at least one inlet valve 7 and one outlet valve 8. Inlet valve 7 is connected to an air system (not shown) and enables the controlling of the supply of fresh air and, if necessary, residual gas, or the supply of an air-fuel mixture. Outlet valve 8 is connected to an exhaust gas system (not shown).

Inlet valves 7 and outlet valves 8 are controlled by a camshaft 9. On camshaft 9 there is situated a camshaft sensor wheel 10. A phase sensor 11 is allocated to camshaft sensor wheel 10. Camshaft sensor wheel 10 has for example a marking that can be acquired by phase sensor 11. For each complete rotation of camshaft 9, this marking is acquired exactly once by phase sensor 11. Phase sensor 11 then communicates a signal to control device 3 via a signal line 12.

The internal combustion engine also has a crankshaft 13. A crankshaft sensor wheel 14 is situated on crankshaft 13. Crankshaft sensor wheel 14 has markings that are distributed uniformly over the circular surface of crankshaft sensor wheel 14, i.e., the circumference of crankshaft sensor wheel 14. During the operation of internal combustion engine 2, crankshaft 13 rotates, and crankshaft sensor wheel 14 thus also rotates. Via a crankshaft sensor 15 allocated to crankshaft sensor wheel 14 (said sensor being fashioned for example as an optical or magnetic sensor), for each recognized marking a crankshaft signal is sent to control device 3 via signal line 16. Crankshaft sensor wheel 14 has what is known as a synchronization gap that designates a particular point on crankshaft sensor wheel 14 at which a provided marking is omitted or modified, so that when it is recognized a synchronization can be carried out.

If internal combustion engine 2 is fashioned as a four-stroke engine, one work cycle extends over 720° of crankshaft rotation. Therefore, the position found upon recognition of the crankshaft sensor synchronization gap is ambiguous. In order to resolve the ambiguity, the additional information from phase sensor 11 is used. Because camshaft 9 rotates only once per work cycle (720° crankshaft=360° camshaft), the precise angular position within the work cycle can therefore be determined.

It is known to use phase sensor 11, via an evaluation of what are known as segment times (detectable segment of the camshaft sensor wheel with a defined segment length), to determine a substitute rotational speed with which the plausibility of a rotational speed is checked that was obtained by evaluating the signals, designated crankshaft signals, from crankshaft sensor 15. Given a corresponding design of camshaft sensor wheel 10, the signal pattern of phase sensor 11 can also be evaluated with the aim of determining, solely therefrom, the engine position and the substitute rotational speed, which can be used to realize an emergency function in the case of disturbance of crankshaft sensor 15.

Using the method according to the present invention, a current angular position can now be produced for the determination of the position of internal combustion engine 2 solely from the signals of cylinder pressure sensors 5. In addition, an advantageous specific embodiment of the method according to the present invention enables the production of a current rotational speed. In this way, a plausibility test of the crankshaft signal is possible.

In order to carry out the method according to the present invention, internal combustion engine 2 in particular requires no camshaft sensor wheel 10 and sensor 11. If these are nonetheless present, the method according to the present invention makes it possible also to carry out a plausibility test of the signals obtained from phase sensor 11. If a disturbance is recognized for example of crankshaft sensor 15, the method according to the present invention can be used to realize an emergency driving function, independent of whether camshaft sensor wheel 10 and phase sensor 11 are present. Of course, the method according to the present invention can also be used to compensate a disturbance of phase sensor 11.

Figure 2:
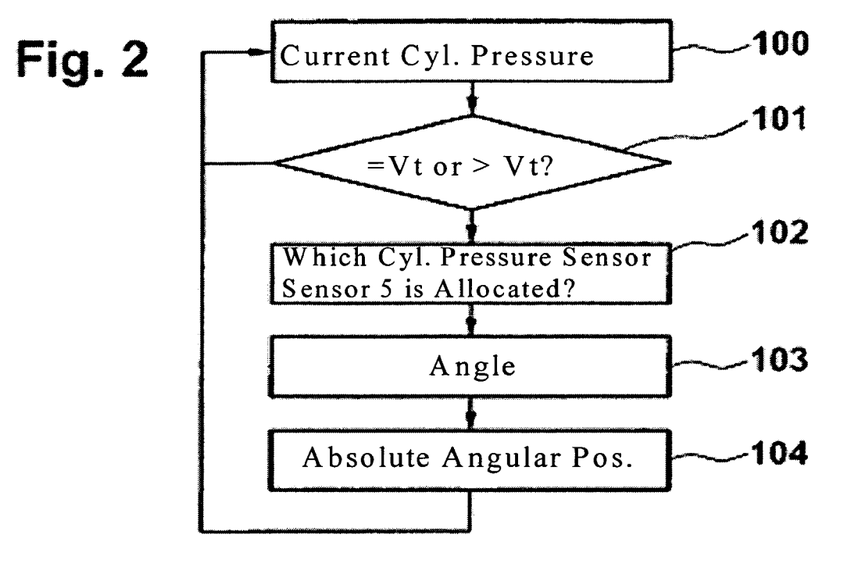
FIG. 2 shows a schematic flow diagram for determining the angular position of an internal combustion engine.

FIG. 2 shows a highly simplified flow diagram for the description of a possible specific embodiment of a method for determining the position on the basis of angular pressure signals.

In a step 100, a current cylinder pressure is acquired using a cylinder pressure sensor 5. In a step 101, it is checked whether the acquired cylinder pressure corresponds to a prespecifiable threshold value, or has exceeded this value. If this is not the case, branching back to step 100 takes place.

The threshold value is selected such that it corresponds as unambiguously as possible to a particular position of cylinder 4 to which cylinder pressure sensor 5 is allocated. In principle, the pressures occurring in cylinder 4, or in a combustion chamber allocated to cylinder 4, are subject to strong fluctuations. For example, the pressures occurring in the combustion chamber are influenced by the opening or closing of inlet valve 7 and outlet valve 8, the position or setting of a piston situated in cylinder 4, the time and type of fuel metering, as well as the time of ignition and the type of combustion. In order to enable a maximally precise determination of an angular position of internal combustion engine 2, it is therefore advantageous if the threshold value is selected such that it occurs, as far as possible, only once during a work cycle of internal combustion engine 2, this being to the greatest possible extent always at exactly the same angular position within the work cycle.

As already stated above, the pressure curves of cylinder 4 vary in their shape and maximum value as a function of the respective operating point and on a current injection pattern. Depending on the position of the combustion, the pressure curves have one maximum or two maxima. If the combustion begins close to the upper dead center in such a way that a decrease in pressure and a subsequent increase in pressure can no longer take place after the upper dead center is reached, the pressure curve has only one maximum. If the combustion begins significantly after the upper dead center has been reached, the pressure curve has two maxima.

In order to determine the angular position, in the specific embodiment shown as an example in FIG. 2, in a step 102 the cylinder 4 is first determined to which cylinder pressure sensor 5 is allocated. In a step 103, the angle associated with the threshold value is then acquired. If the threshold value is for example selected such that it describes the upper dead center of cylinder 4, the associated angle is for example 0°. If internal combustion engine 2 has a plurality of cylinders 4, cylinders 4 operate in an out-of-phase manner. This means that the angle associated with the threshold value is first present relative to cylinder 4.

In a step 104, the relative angle obtained in step 103 is used to determine the absolute angular position of internal combustion engine 2. Here, the phase displacement is taken into account of cylinder 4 to which cylinder pressure sensor 5 is allocated that produces the cylinder pressure signal acquired in step 100.

If internal combustion engine 2 has a plurality of cylinders 4, it is particularly advantageous to allocate a cylinder pressure sensor 5 to each of a plurality of cylinders or to all cylinders 4, as is shown in FIG. 1. In this way, a continuous position and rotational speed calculation is possible, because a particularly large number of angular values are then present that can be used as support points for an extrapolation.

Figure 3:
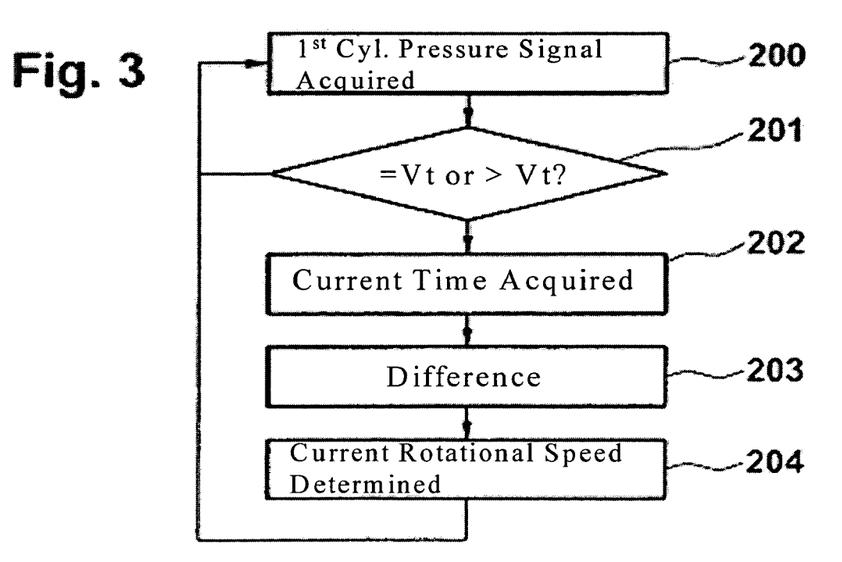
FIG. 3 shows a flow diagram for determining the rotational speed of an internal combustion engine on the basis of cylinder pressure signals.

FIG. 3 shows a highly simplified flow diagram of process steps that are carried out in the determination of a current rotational speed of internal combustion engine 2 from cylinder pressure signals.

In a step 200, first a cylinder pressure signal is acquired, and in a step 201 it is checked whether a threshold value allocated to the cylinder pressure signal has been reached or exceeded. If this is the case, in a step 202 a current time is acquired.

In a step 203, a difference is formed from the current time and a time acquired previously using the same method. In a step 204, the current rotational speed is determined as a function of the time difference determined in step 203 and on an angular difference likewise determined in step 203. Here, the angular difference corresponds to the determined angle that was traveled between the current time acquired in step 202 and a previously acquired time. Here, the angular difference can be determined using method steps of the method segment shown in FIG. 2.

Figure 4:
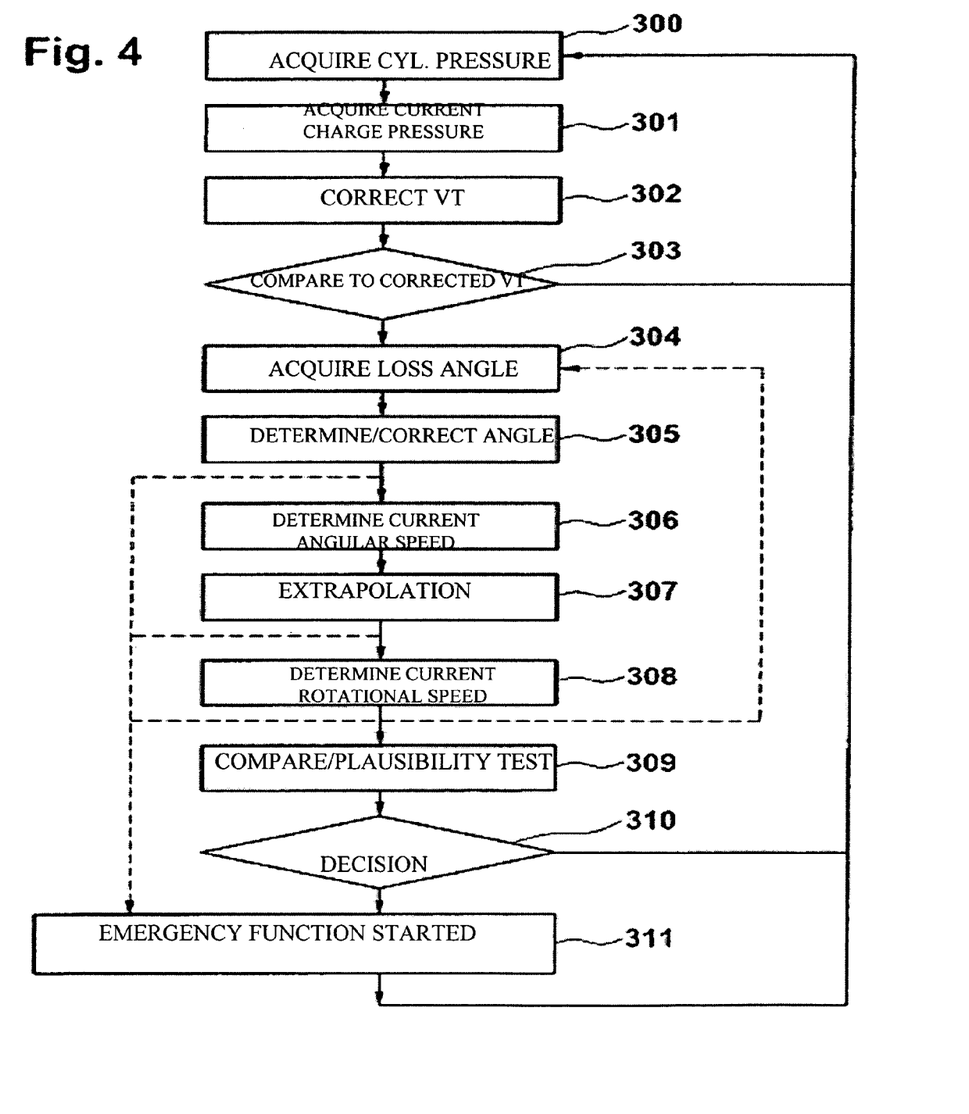
FIG. 4 shows a schematic representation of a flow diagram of a possible specific embodiment of the method according to the present invention in the controlling/regulation of an internal combustion engine.

FIG. 4 shows a simplified flow diagram indicating a permanent execution of a specific embodiment of the method according to the present invention during the operation of internal combustion engine 2. In a step 300, the cylinder pressure is acquired by cylinder pressure sensor 5. Here, the signals of all cylinder pressure sensors 5 are taken into account.

In a step 301, a current charge pressure is acquired. The charge pressure describes the air pressure prevailing in the air system. If for example a turbocharger or a compressor is allocated to internal combustion engine 2, the charge pressure changes as a function of the current operating position. When inlet valve 7 is open, the air enters from the air system into the combustion chamber formed in cylinder 4. In the following compression phase, inlet valve 7 is closed and the air in the combustion chamber is compressed. The cylinder pressure prevailing in the compression phase is thus dependent on the original pressure, which corresponds to the charge pressure. Given an acquisition or evaluation of the threshold value, it is therefore particularly advantageous to take into account the current charge pressure.

In a step 302, the threshold value is corrected as a function of the acquired charge pressure. This can be carried out for example using a characteristic field. If the threshold value designates the upper dead center of cylinder 4, the correction makes it possible to adapt the threshold value as a function of the acquired charge pressure in such a way that this threshold value continues to designate the upper dead center as precisely as possible.

Finally, in a step 303 the cylinder pressure acquired in step 300 is compared to the corrected threshold value. If the acquired cylinder pressure is lower than the threshold value, branching back to step 300 takes place. If the acquired cylinder pressure reaches the corrected threshold value, in a step 304 an operating point-dependent loss angle is acquired. The loss angle is determined such that a taking into account of quantities that influence the relation to the cylinder pressure angular position is possible and a compensation can be carried out in order to enable the determination of a maximally precise current angular position. Quantities that can influence the relation cylinder pressure-angular position include for example a current rotational speed or a current acceleration.

In a step 305, the angle of cylinder 4 associated with the threshold value is determined and is corrected as a function of the determined loss angle.

In a step 306, a current angular speed is determined. The current angular speed is as a function of the angular difference (the angle determined since the acquisition of the last angular position) and of the time that has elapsed.

In a step 307, an extrapolation takes place on the basis of the current angular speed. The extrapolation thus enables a prediction as to when internal combustion engine 2 will be situated in which position. This information can be used for example in a step 311 for the controlling and regulating of internal combustion engine 2, in particular for controlling the injection and ignition. Here it is particularly advantageous if the threshold value is selected such that the information obtained therefrom can already be used for the immediately following combustion. In this way, a particularly precise controlling or regulation of internal combustion engine 2 is possible solely on the basis of the acquired cylinder pressures.

In a step 308, the current rotational speed is determined. This information can for example be used again for step 304, if the cylinder pressure of cylinder 4 has again reached the threshold value, or if the cylinder pressure of another cylinder, in particular the next successive cylinder 4, reaches the threshold value.

The rotational speed determined in step 308 can also be used in particular for controlling and regulating internal combustion engine 2, in particular for controlling and regulating the injection, ignition, and mixture formation in step 311.

In a step 309, it can be provided to compare the information (rotational speed, angular speed, current position) determined on the basis of the cylinder pressures with values acquired by crankshaft sensor 15. This enables a plausibility test or a functional test of crankshaft sensor 15. The method according to the present invention does indeed enable operation of internal combustion engine 2 without a camshaft sensor wheel 10 and phase sensor 11; however, for a particularly reliable operation of internal combustion engine 2 it is conceivable nonetheless to provide these components and to have an even higher degree of redundancy of the information available. In this case, in step 309 a plausibility test or functional test of phase sensor 11 can also be carried out.

In a step 310, it is decided whether a functional disturbance is present that requires changeover to an emergency function. If this is not the case, branching takes place back to step 300.

If, however, a disturbance is present, for example if crankshaft sensor 15 is defective, branching takes place back to a step 311. In step 311, the emergency function is then started, and internal combustion engine 2 is regulated and controlled entirely on the basis of the information from cylinder pressure sensors 5.

If internal combustion engine 2 does not have a camshaft sensor wheel 10 and does not have a phase sensor 11, the resolution of the ambiguity of the signal of crankshaft sensor 15 can take place on the basis of the current angular position of internal combustion engine 2. If only this function is to be realized, in a multi-cylinder internal combustion engine 2 the presence of only one cylinder pressure sensor 5 on only one cylinder 4 is also sufficient. The information produced in step 305 regarding the current angular position can then be used in step 311 for the controlling and regulation of internal combustion engine 2.

Of course, a large number of additional specific embodiments are conceivable. For example, step 301 can be omitted or can be executed before step 300.

In particular, different specific embodiments result from a different number of cylinders 4 and a different number of pressure sensors 5. For example, it is conceivable to carry out [sic] the rotational speed or the current angular position in a four-cylinder engine, in which a pressure sensor 5 is allocated to each cylinder 4, in parallel fashion on the basis of the cylinder pressures of the first and third cylinders 4, as well as on the basis of the cylinder pressure values of second and fourth cylinders 4. In this way, two redundant items of information are always produced. This information can then be used to carry out a plausibility test. In this way, a defect of a cylinder pressure sensor 5 can be inferred if the difference in the redundant information exceeds a prespecifiable boundary value. In addition, it is possible to form a mean value from the redundant items of information and to use this mean value as a basis for the controlling and regulation of internal combustion engine 2.

If internal combustion engine 2 has still more cylinders 4, further variant possibilities are conceivable. For example, the number of redundantly determined items of information can be increased, or the precision of the current angular position or rotational speed can be increased by taking a particularly large number of cylinder pressure signals as a basis for the determination of this information. For example, in an eight-cylinder engine it is possible to determine a current angular position every 90° of crankshaft angle on the basis of a currently acquired cylinder pressure. In addition, it is conceivable for the threshold values of the cylinder pressure sensors allocated to cylinders 4 to be different.

In order to determine the rotational speed or position of internal combustion engine 2 as precisely as possible, it is advantageous to select the threshold values such that this value has a sufficiently large disturbance distance from the low-pressure phase, so that fluctuations that can occur for example due to the opening and closing of inlet valve 7 and of outlet valve 8 can no longer cause a disturbance of the cylinder pressure. In addition, it is advantageous if the threshold value is situated far enough away from the injection phase that the injection can always be controlled with the current, and thus very precise, angle.

If internal combustion engine 2 is operated in an emergency function, and is controlled partially or completely on the basis of the acquired cylinder pressures, it can be particularly advantageous during emergency driving operation to select an injection strategy that provides only what is known as a block injection, and whose injection time points are selected such that a late combustion occurs. In this way, it is ensured that the pressure curves in cylinders 4 always have two pronounced maxima, the first maximum describing with a high degree of precision (+/−1° crankshaft angle) the position of the upper dead center of the relevant cylinder 4.

What is claimed is:

1. An internal combustion engine system, comprising:
    an internal combustion engine having at least one cylinder;
    a cylinder pressure sensor allocated to the at least one cylinder; and
    a control arrangement for operating the internal combustion engine, the internal combustion engine having at least one cylinder and a cylinder pressure sensor allocated to the cylinder, by performing the following:
        acquiring a cylinder pressure by the cylinder pressure sensor,
        checking whether the cylinder pressure reaches a pre-specifiable threshold value,
        when the threshold value is reached, inferring an angular position associated with the threshold value, and
        making available the angular position for an operation of the internal combustion engine.

2. A control device system for controlling an internal combustion engine having at least one cylinder, a cylinder pressure sensor being allocated to the at least one cylinder, comprising:
    a control arrangement connectable to the cylinder pressure sensor, wherein a signal that describes a cylinder pressure from the cylinder pressure sensor may be communicated to the control arrangement;
    a testing arrangement to test whether the cylinder pressure reaches a prespecified threshold value;
    an angular position inferring arrangement to infer an angular position associated with the threshold value if the prespecifiable threshold value is reached.

3. The control device system of claim 2, wherein the control arrangement is for operating an internal combustion engine, the internal combustion engine having at least one cylinder and a cylinder pressure sensor allocated to the cylinder, by performing the following:
    acquiring the cylinder pressure by the cylinder pressure sensor;
    checking whether the cylinder pressure reaches the pre-specifiable threshold value;
    when the threshold value is reached, inferring the angular position associated with the threshold value; and
    making available the angular position for an operation of the internal combustion engine.

4. A computer readable medium having a computer program that is executable by a computing device of a control device for controlling an internal combustion engine, comprising:
    program code for performing the following:
        acquiring the cylinder pressure by the cylinder pressure sensor;
        checking whether the cylinder pressure reaches the pre-specifiable threshold value;
        when the threshold value is reached, inferring the angular position associated with the threshold value; and
        making available the angular position for an operation of the internal combustion engine.

5. The computer readable medium of claim 4, wherein the computer program is stored on a storage element allocated to the computing device, the storage element including one of a random access memory (RAM), a read-only memory (ROM), a flash memory, an optical storage medium, and a magnetic storage medium.

6. A method for operating an internal combustion engine, the internal combustion engine having at least one cylinder and a cylinder pressure sensor allocated to the cylinder, the method comprising:
    acquiring a cylinder pressure by the cylinder pressure sensor;
    checking whether the cylinder pressure reaches a prespecifiable threshold value;
    when the threshold value is reached, inferring an angular position associated with the threshold value; and
    making available the angular position for an operation of the internal combustion engine.

7. The method of claim 6, wherein the threshold value is prespecified so that at least one of the following is satisfied:
    the threshold value is reached only once per work cycle;
    the threshold value describes a pressure that occurs during the compression phase;
    the threshold value describes a pressure that occurs during the compression phase before the beginning of a combustion;
    the threshold value describes a pressure that occurs during the compression phase and that is sufficiently far removed from the low-pressure phase that a disturbance due to the transition from the low-pressure phase to the compression phase is as low as possible; and
    the threshold value describes a pressure that occurs during the compression phase before the beginning of a fuel metering, so that a controlling of a fuel metering device is possible by taking into account the angular position that is determined when the threshold value is reached.

8. The method of claim 7, wherein a time between a reaching of the threshold value and a subsequent reaching of the threshold value by the same or by another cylinder pressure sensor is determined, and a current rotational speed is inferred as a function of an angular difference and the determined time.

9. The method of claim 8, wherein:
    at least one cylinder pressure sensor is allocated to a first set and at least one cylinder pressure sensor is allocated to a second set, the first and the second set being disjoint, and a first rotational speed is determined as a function of the acquired cylinder pressures of the first set of cylinders and a second rotational speed is determined as a function of the acquired cylinder pressures of the second set of cylinders, and
    one of the following is satisfied:
        the rotational speed is formed from a mean value of the first rotational speed and the second rotational speed, and a plausibility test of the first rotational speed is carried out and the rotational speed is formed from the second rotational speed if the first rotational speed is not plausible.

10. The method of claim 6, wherein the threshold value describes a maximum pressure.

11. The method of claim 6, wherein the internal combustion engine is operated with a late combustion so that the pressure curve has two maxima and the threshold value corresponds to a first maximum.

12. The method of claim 6, wherein using at least one additional pressure sensor allocated to at least one additional cylinder, the cylinder pressure of the additional cylinder is acquired, and it is checked whether the cylinder pressure reaches a prespecifiable additional threshold value, and, when the additional threshold value is reached, an angular position associated with the threshold value is inferred.

13. The method of claim 6, wherein the same threshold value is prespecified for all of the cylinders.

14. The method of claim 6, wherein the threshold values are selected so that angular positions associated with the threshold values of each pair of successive cylinders have the same angular difference.

15. The method of claim 6, wherein one of the threshold value and the angular position is determined as a function of a charge pressure.

16. The method of claim 6, wherein the angular position is determined as a function of a prespecifiable, operating point-dependent loss angle.

17. The method of claim 6, wherein intermediate values for a continuous position determination are determined by extrapolating values between each pair of angular positions determined as a function of the cylinder pressure.

18. The method of claim 6, wherein an angular speed is determined as a function of the determined angular values, and a current rotational speed is inferred therefrom.

19. The method of claim 18, wherein:
at least one cylinder pressure sensor is allocated to a first set of cylinder pressure sensors, and at least one additional cylinder pressure sensor is allocated to a second set of cylinder pressure sensors, the first and second set being disjoint, and a first angular speed is determined as a function of the acquired cylinder pressures of the first set of cylinders and a second angular speed is determined as a function of the acquired cylinder pressures of the second set of cylinders, and one of the following is satisfied:
the angular speed is formed from a mean value of the first angular speed and the second angular speed, and
a plausibility test of the first angular speed is carried out and the angular speed is formed from the second angular speed if the first angular speed is not plausible.

20. The method of claim 18, wherein an acceleration is determined and a rotational speed is determined as a function of the determined acceleration.

21. The method of claim 20, wherein the acceleration is determined by comparing a time difference and a previously measured time difference.

22. The method of claim 6, wherein the operations are permanently executed at least after synchronization of the internal combustion engine has taken place during a startup, one of the following being satisfied:
performing a plausibility test of a crankshaft sensor,
performing a plausibility test of a phase sensor,
performing a plausibility test of the pressure sensor,
inferring an ignition misfiring, and
inferring a threat of an engine overload.

* * * * *